US010583926B2

(12) United States Patent
Erhel et al.

(10) Patent No.: US 10,583,926 B2
(45) Date of Patent: Mar. 10, 2020

(54) AIRCRAFT SEAT

(71) Applicant: BOMBARDIER INC., Dorval (CA)

(72) Inventors: Philippe Erhel, Montréal (CA); Pete Meister, Medley, FL (US)

(73) Assignee: BOMBARDIER INC., Dorval, Quebec (CA)

( * ) Notice: Subject to any disclaimer, the term of this patent is extended or adjusted under 35 U.S.C. 154(b) by 0 days.

(21) Appl. No.: 15/514,341

(22) PCT Filed: Sep. 24, 2015

(86) PCT No.: PCT/US2015/052021
§ 371 (c)(1),
(2) Date: Mar. 24, 2017

(87) PCT Pub. No.: WO2016/049356
PCT Pub. Date: Mar. 31, 2016

(65) Prior Publication Data
US 2017/0275003 A1     Sep. 28, 2017

Related U.S. Application Data

(60) Provisional application No. 62/055,439, filed on Sep. 25, 2014.

(51) Int. Cl.
*B64D 11/06* (2006.01)
*B60N 2/14* (2006.01)
(Continued)

(52) U.S. Cl.
CPC ............ *B64D 11/0696* (2013.01); *B60N 2/06* (2013.01); *B60N 2/14* (2013.01); *B60N 2/34* (2013.01); *B64D 11/0641* (2014.12)

(58) Field of Classification Search
CPC ............ B64D 11/0696; B64D 11/0641; B64D 11/064; B60N 2/06; B60N 2/14; B60N 2/34
See application file for complete search history.

(56) References Cited

U.S. PATENT DOCUMENTS

| 1,663,898 A | 3/1928 | Bitzenburger |
| 1,693,120 A * | 11/1928 | Rhyner ................... B60N 2/06 |
| | | 248/424 |

(Continued)

FOREIGN PATENT DOCUMENTS

| CN | 86209542 U | 12/1987 |
| CN | 2123457 U | 12/1992 |

(Continued)

OTHER PUBLICATIONS

Chinese Office Action dated Jul. 27, 2018, for Chinese Patent Application No. 201580051408.4.
(Continued)

*Primary Examiner* — Theodore V Adamos
(74) *Attorney, Agent, or Firm* — Karceski IP Law, PLLC

(57) ABSTRACT

A seat attachable to a floor of a vehicle includes a seat frame movable between a first position and a second position and a mounting assembly attached to the seat frame and configured to be secured to the floor. The mounting assembly and seat frame are configured so that when the seat frame is in the second position first and second sliding assemblies of the mounting assembly are both located in forwardly extended positions and no part of the mounting assembly contacts the floor forward of a front connection of the mounting assembly.

13 Claims, 9 Drawing Sheets

(51) Int. Cl.
*B60N 2/06* (2006.01)
*B60N 2/34* (2006.01)

(56) References Cited

U.S. PATENT DOCUMENTS

| | | | |
|---|---|---|---|
| 2,309,735 A | 2/1943 | Koch et al. | |
| 2,616,483 A | 11/1952 | Jensen | |
| 2,864,431 A * | 12/1958 | Eaton | B60N 2/067 |
| | | | 248/393 |
| 3,718,365 A | 2/1973 | Gibson | |
| 4,595,236 A | 6/1986 | Rizzoli | |
| 4,625,934 A | 12/1986 | Ryan et al. | |
| 4,637,652 A | 1/1987 | Bergenwall | |
| 4,834,452 A * | 5/1989 | Goodrich | B60N 2/062 |
| | | | 297/240 |
| 4,913,489 A * | 4/1990 | Martin | B60P 7/0815 |
| | | | 248/429 |
| 5,161,765 A | 11/1992 | Wilson | |
| 5,183,313 A * | 2/1993 | Cunningham | B60N 2/242 |
| | | | 248/429 |
| 5,568,960 A | 10/1996 | Oleson et al. | |
| 5,725,277 A | 3/1998 | Knoblock | |
| 5,740,989 A * | 4/1998 | Daines | B64D 11/00 |
| | | | 244/118.6 |
| 5,795,025 A | 8/1998 | Murphy | |
| 5,860,701 A | 1/1999 | Jungjohann et al. | |
| 5,868,467 A | 2/1999 | Moll | |
| 5,954,401 A | 9/1999 | Koch et al. | |
| 6,000,659 A | 12/1999 | Bauer | |
| 6,000,755 A | 12/1999 | Uhlenbrock | |
| 6,113,183 A * | 9/2000 | Koch | B64D 11/06 |
| | | | 297/162 |
| 6,189,852 B1 * | 2/2001 | Hopley | B60N 2/01591 |
| | | | 248/429 |
| 6,227,489 B1 | 5/2001 | Kitamoto et al. | |
| 6,237,994 B1 | 5/2001 | Bentley et al. | |
| 6,260,813 B1 * | 7/2001 | Whitcomb | B64D 11/0696 |
| | | | 244/118.6 |
| 6,402,244 B1 | 6/2002 | Schonenberg et al. | |
| 6,439,661 B1 | 8/2002 | Brauning | |
| 6,543,848 B1 | 4/2003 | Suga et al. | |
| 6,557,919 B2 | 5/2003 | Suga et al. | |
| 6,578,917 B1 | 6/2003 | Aubert et al. | |
| 6,616,099 B2 | 9/2003 | Sankrithi | |
| 6,624,773 B2 | 9/2003 | Wong | |
| 6,679,556 B1 | 1/2004 | Alvestad | |
| 6,691,970 B1 * | 2/2004 | Sutton, Sr. | B60N 2/062 |
| | | | 248/425 |
| 6,769,739 B2 | 8/2004 | Salzer et al. | |
| 6,776,454 B1 | 8/2004 | Aubert et al. | |
| 6,808,097 B2 | 10/2004 | Kim et al. | |
| 6,808,234 B2 | 10/2004 | Bauer et al. | |
| 6,929,320 B2 | 8/2005 | Laurent | |
| 6,949,904 B2 | 9/2005 | Rumney | |
| 7,090,296 B2 | 8/2006 | Massimo | |
| 7,100,985 B2 | 9/2006 | Wagner et al. | |
| 7,108,325 B2 | 9/2006 | Williamson et al. | |
| 7,108,326 B2 | 9/2006 | Schurg | |
| 7,114,781 B2 | 10/2006 | Costaglia | |
| 7,178,871 B2 | 2/2007 | Round et al. | |
| 7,182,402 B1 | 2/2007 | Ahad | |
| 7,204,554 B2 | 4/2007 | Wieclawski | |
| 7,364,234 B2 | 4/2008 | Begin et al. | |
| 7,377,467 B2 | 5/2008 | Saint-Jalmes | |
| 7,427,102 B2 | 9/2008 | Wagner et al. | |
| 7,517,010 B2 | 4/2009 | Saint-Jalmes et al. | |
| 7,517,014 B2 | 4/2009 | Schroeder et al. | |
| 7,533,930 B1 | 5/2009 | Fissette et al. | |
| 7,568,765 B2 | 8/2009 | Brauning | |
| 7,578,470 B2 | 8/2009 | Plant | |
| 7,637,571 B2 | 12/2009 | Okano et al. | |
| 7,699,400 B2 | 4/2010 | Speh et al. | |
| 7,950,740 B2 | 5/2011 | Bunea et al. | |
| 8,025,334 B2 | 9/2011 | Schmitz et al. | |
| 8,267,472 B2 | 9/2012 | Large et al. | |

| | | | |
|---|---|---|---|
| 8,313,059 B2 | 11/2012 | Ferry et al. | |
| 8,313,060 B2 | 11/2012 | Darbyshire | |
| 8,585,146 B1 | 11/2013 | Giasson et al. | |
| 8,783,770 B2 | 7/2014 | Tanaka et al. | |
| 8,998,329 B2 | 4/2015 | Becker et al. | |
| 2002/0149247 A1 | 10/2002 | Diffrient | |
| 2003/0080699 A1 | 5/2003 | Rumeny | |
| 2003/0085597 A1 | 5/2003 | Ludeke et al. | |
| 2003/0189370 A1 | 10/2003 | Hemmer et al. | |
| 2006/0108848 A1 * | 5/2006 | Williamson | A47C 3/18 |
| | | | 297/344.24 |
| 2006/0186715 A1 | 8/2006 | Schweizer | |
| 2007/0069563 A1 | 3/2007 | Herzog | |
| 2008/0005843 A1 | 1/2008 | Lokhorst et al. | |
| 2008/0007101 A1 | 1/2008 | Abt et al. | |
| 2008/0009958 A1 | 1/2008 | Abt et al. | |
| 2008/0018153 A1 | 1/2008 | Forgatsch et al. | |
| 2008/0088166 A1 | 4/2008 | Gardiner et al. | |
| 2008/0093502 A1 | 4/2008 | Bettell | |
| 2008/0121757 A1 | 5/2008 | Pozzi et al. | |
| 2008/0197677 A1 | 8/2008 | Nivet | |
| 2009/0015047 A1 | 1/2009 | Baumann | |
| 2009/0021065 A1 | 1/2009 | Brauning | |
| 2009/0108653 A1 | 4/2009 | Fissette et al. | |
| 2009/0195039 A1 | 8/2009 | Fujita et al. | |
| 2009/0195040 A1 | 8/2009 | Birbeck | |
| 2009/0295209 A1 | 12/2009 | Lee | |
| 2009/0302158 A1 | 12/2009 | Darbyshire et al. | |
| 2009/0319086 A1 | 12/2009 | Kramer | |
| 2010/0032994 A1 | 2/2010 | Lawson | |
| 2010/0032999 A1 | 2/2010 | Petitpierre | |
| 2010/0052392 A1 * | 3/2010 | Lung | B60N 2/06 |
| | | | 297/344.24 |
| 2010/0109387 A1 | 5/2010 | Merensky | |
| 2010/0176632 A1 | 7/2010 | Alford et al. | |
| 2010/0201172 A1 | 8/2010 | Hudswell et al. | |
| 2010/0253123 A1 | 10/2010 | DeCreene et al. | |
| 2010/0308164 A1 | 12/2010 | McKeever | |
| 2011/0049960 A1 | 3/2011 | Ferguson et al. | |
| 2011/0084527 A1 | 4/2011 | Marini et al. | |
| 2011/0133030 A1 * | 6/2011 | Kennedy | B64D 11/06 |
| | | | 244/118.5 |
| 2012/0074751 A1 | 3/2012 | De La Garza et al. | |
| 2012/0132746 A1 | 5/2012 | Sizelove | |
| 2012/0298798 A1 * | 11/2012 | Henshaw | B64D 11/06 |
| | | | 244/118.6 |
| 2013/0161990 A1 * | 6/2013 | Oleson | B64D 11/06 |
| | | | 297/344.21 |
| 2014/0191081 A1 | 7/2014 | Ward et al. | |
| 2015/0108804 A1 * | 4/2015 | Meister | B64D 11/06 |
| | | | 297/313 |
| 2015/0298812 A1 | 10/2015 | Jasny et al. | |
| 2015/0307194 A1 * | 10/2015 | Oleson | B64D 11/064 |
| | | | 297/217.2 |
| 2015/0352983 A1 * | 12/2015 | Cailleteau | B60N 2/067 |
| | | | 297/340 |
| 2017/0313213 A1 * | 11/2017 | Meister | B60N 2/2209 |
| 2017/0341754 A1 * | 11/2017 | Gross | B64D 11/0639 |

FOREIGN PATENT DOCUMENTS

| | | |
|---|---|---|
| CN | 1132711 A | 10/1996 |
| CN | 2242850 Y | 12/1996 |
| CN | 1125739 C | 10/2003 |
| CN | 101516729 A | 8/2009 |
| CN | 103359286 A | 10/2013 |
| CN | 103863151 A | 6/2014 |
| DE | 1630538 A1 | 6/1971 |
| DE | 19853156 A1 | 5/2000 |
| EP | 0353210 | 1/1990 |
| EP | 0670241 A1 | 9/1995 |
| EP | 0808740 A2 | 11/1997 |
| EP | 1366987 | 12/2003 |
| EP | 1598270 A2 | 11/2005 |
| EP | 2213504 A2 | 8/2010 |
| EP | 2272711 B1 | 6/2011 |
| EP | 2353926 A1 | 8/2011 |
| EP | 1495908 B2 | 9/2011 |

(56) References Cited

FOREIGN PATENT DOCUMENTS

| | | |
|---|---|---|
| EP | 2289734 B1 | 10/2011 |
| EP | 2671752 A1 | 12/2013 |
| FR | 2776586 A1 | 10/1999 |
| FR | 2898312 A1 | 9/2007 |
| GB | 2454751 | 5/2009 |
| GB | 2362095 A | 11/2011 |
| GB | 2496452 | 5/2013 |
| JP | 2003033243 A | 2/2003 |
| JP | 2003252085 A | 9/2003 |
| JP | 2007261353 A | 10/2007 |
| JP | 2010221861 A | 10/2010 |
| JP | 2011073552 A | 4/2011 |
| WO | 9000360 | 1/1990 |
| WO | 2006021766 A1 | 3/2006 |
| WO | 2006041570 | 4/2006 |
| WO | 2008107689 A1 | 9/2008 |
| WO | 2012003096 | 1/2012 |
| WO | 2012053022 A1 | 4/2012 |
| WO | 2012135250 A1 | 10/2012 |
| WO | 2014064525 A2 | 5/2014 |
| WO | 2014115106 A1 | 7/2014 |
| WO | 2014147449 A1 | 9/2014 |

OTHER PUBLICATIONS

International Search Report and Written Opinion dated Jan. 19, 2016, for International Patent Application No. PCT/US2015/051971.

International Search Report and Written Opinion dated Jan. 20, 2016, for International Patent Application No. PCT/US2015/052012.

International Search Report and Written Opinion dated Jan. 4, 2016, for International Patent Application No. PCT/US2015/052002.

International Search Report and Written Opinion dated Nov. 5, 2015, for International Patent Application No. PCT/US2015/051996.

Search Report dated Mar. 25, 2015, for United Kingdom Patent Application No. 1417017.9.

Search Report dated Mar. 25, 2015, for United Kingdom Patent Application No. 1417014.6.

Search Report dated Mar. 25, 2015, for United Kingdom Patent Application No. 1417012.0.

Search Report dated Mar. 25, 2015, for United Kingdom Patent Application No. 1417009.6.

International Search Report and Written Opinion dated May 2, 2016, for International Patent Application No. PCT/US2015/052021.

International Search Report and Written Opinion dated May 2, 2016, for International Patent Application No. PCT/US2015/051991.

International Preliminary Report on Patentability dated Apr. 6, 2017, for International Patent Application No. PCT/US2015/052021.

Declaration of Pete Meister dated Jun. 22, 2017, including two exhibits.

Declaration of Michael Oleson dated Sep. 22, 2017, including one exhibit.

Chinese Office Action dated Dec. 3, 2018, for Chinese Patent Application No. 201580051453.X.

Chinese Office Action dated Dec. 3, 2018, for Chinese Patent Application No. 201580051359.4.

Chinese Office Action dated Dec. 26, 2018, for Chinese Patent Application No. 201580051328.9.

Chinese Office Action dated Oct. 8, 2019, for Chinese Patent Application No. 201580051408.4.

Chinese Office Action dated Aug. 21, 2019, for Chinese Patent Application No. 201580051328.9.

* cited by examiner

AIRCRAFT SEAT

CROSS-REFERENCE TO RELATED APPLICATION(S)

This is a National Stage Entry into the United States Patent and Trademark Office from International Patent Application No. PCT/US2015/052021, having an international filing date of Sep. 24, 2015, which application relies for priority on U.S. Provisional Patent Application Ser. No. 62/055,439, entitled "AIRCRAFT SEAT," filed Sep. 25, 2014, the entire contents of both of which are hereby incorporated by reference.

TECHNICAL FIELD

The present disclosure concerns a vehicle seat. Specifically, the present disclosure concerns a construction for an aircraft passenger seat.

DESCRIPTION OF THE RELATED ART

A wide variety of types of seats have been incorporated into commercial, business and private aircraft. Aircraft seats are often mounted to aircraft via tracks that run longitudinally along the floor of the aircraft (from front to rear). Typically, each seat is mounted to two of such tracks. Most coach class aircraft seats in typical commercial aircraft are adjustable among at least two positions such as an upright taxi, take-off and landing position ("TTL" or "TT&L") and a reclined position. First-class seating may be further adjustable. In business and private aircraft, seats may also be moved among positions such as TTL, reclined, a more reclined "napping" position, and a fully reclined "sleeping" position. Seats that reach the sleeping position sometimes have base portions that move longitudinally relative to the floor as far as 19 inches or more while reclining to allow such a seat to do so without interfering with adjacent seats or items in the cabin. Business and private aircraft seats may also rotate, for example from forward facing to inward facing or to rearward facing.

Business and private aircraft cabins may also have additional furniture such as tables near the seats. Such furniture is typically mounted to floors of such aircraft, often to tracks within the floor, perhaps the same tracks used to mount the seats. The furniture may be mounted in place and may not be as movable or adjustable as the seats. Accordingly, the seating may also be configured to be moved toward such a table when the passenger desires to use the table and away from the table when the passenger is not using the table.

Many adjustment mechanisms have been employed to recline, slide and rotate aircraft seating. In business and private aircraft in particular where more movable and adjustable seats are employed, certain existing systems leave visually exposed sections of tracks in front of the seats (typically within carpeting) to allow such adjustment by sliding the seat forward in the tracks. Also, in cases of adjustment for example to a reclined or sleeping position, cantilevered sections of existing seat support structures may slide forward substantially the full length of the adjustment. Such cantilevered structure places the mid-seat point of attachment of the seat to the support structure, and the general center of gravity of the seat and passenger, well forward of the forwardmost attachment point of the seat to the floor. Accordingly, such structure may not provide an optimally comfortable experience and/or may require use of more complex, expensive or sturdy materials to maintain seat stability. Therefore, although presently available seats are suitable for their intended applications in various types of aircraft, improvements to the adjustability, functionality, cost and comfort of seating would be welcome, whether addressing one or more of the above issues or other issues.

SUMMARY OF THE INVENTION

The present disclosure seeks to improve upon seats that are known in the prior art by introducing and combining a number of new and unique features, which are detailed in the paragraphs that follow.

According to certain aspects of the disclosure, a seat attachable to a floor of a vehicle may include a seat frame movable between a first position and a second position, and a mounting assembly attached to the seat frame and configured to be secured to the floor. The mounting assembly may include a front connection immovably fixable to the floor and having a first receiver, a first longitudinal member slidable in the first receiver between a retracted position and an extended position, a second longitudinal member attached to and movable with the first longitudinal member, and a second receiver slidable along the second longitudinal member between a retracted position and an extended position, the seat frame being attached to the second receiver. The seat is configured so that when the seat frame is in the first position the first longitudinal member and the second receiver are both in the retracted positions, and when the seat frame is in the second position the first longitudinal member and the second receiver are both in the extended positions. Various options and modifications are possible.

For example, if the floor includes at least one track, and the front connection may be fixed to the track. Also, the first longitudinal member may include at least one protrusion slidable within the track.

The first longitudinal member may include a securing mechanism for selectively securing the first longitudinal member to the track, and the track may include a securing structure, the securing mechanism being configured to cooperate with the securing structure in the track.

The first longitudinal member may include a wheel configured to roll along the track. The second receiver may include an attachment assembly for connection to the seat frame, and the attachment assembly may include a swivel attached to the second receiver for allowing the seat frame to rotate relative to the second receiver. A securing mechanism may be provided to selectively secure the second receiver relative to the second longitudinal member.

A first lateral member may be attached to the second receiver and a third receiver is slidable along the first lateral member between an inboard and an outboard position. The attachment assembly may include a swivel attached to third receiver for allowing seat frame to rotate relative to the third receiver. A securing mechanism may be provided to selectively secure the third receiver relative to the first lateral member.

In the above seat, the first position may be a TTL position and the second position may be a sleeping position. Also, the seat may be movable to a reclined position between the TTL and sleeping positions. The seat may be configured so that when the seat frame is in the reclined position the first longitudinal member is in the retracted position and the second receiver is in the extended position.

According to certain other aspects of the disclosure, a seat attachable to a floor of a vehicle may include a seat frame movable between a first position and a second position, and a mounting assembly attached to the seat frame and configured to be secured to the floor. The mounting assembly may including a front connection immovably fixable to the floor, a first sliding assembly attached to the first connection so as to be longitudinally slidable relative thereto, and a second sliding assembly attached to both the first sliding assembly and to the seat frame so as to be longitudinally slidable independently relative to both. The seat may be configured so that when the seat frame is in the second position the first and second sliding assemblies are both located in forwardly extended positions and no part of the mounting assembly contacts the floor forward of the front connection. Various options and modifications are possible.

For example, if the floor includes at least one track, and the front connection may be fixed to the track. Also, the first longitudinal member may include at least one protrusion slidable within the track.

The first longitudinal member may include a securing mechanism for selectively securing the first longitudinal member to the track, and the track may include a securing structure, the securing mechanism being configured to cooperate with the securing structure in the track.

In the above seat, the first position may be a TTL position and the second position may be a sleeping position.

According to certain other aspects of the disclosure, a seat attachable to a floor of a vehicle may include a seat frame movable between a first position and a second position, and a mounting assembly attached to the seat frame and configured to be secured to the floor. The mounting assembly may include a front connection immovably fixable to the floor, and means for supporting the seat in the first position and the second position without contacting the floor forward of the front connection. Various options and modifications are possible.

For example, the first position may be a TTL position and the second position may be a sleeping position.

According to certain other aspects of the disclosure, a mounting assembly is disclosed for attaching a seat frame to a floor of a vehicle, the seat frame being movable between a first position and a second position. The mounting assembly may include a front connection immovably fixable to the floor and having a first receiver, a first longitudinal member slidable in the first receiver between a retracted position and an extended position, a second longitudinal member attached to and movable with the first longitudinal member, and a second receiver slidable along the second longitudinal member between a retracted position and an extended position, the seat frame being attached to the second receiver. The mounting assembly may be configured so that when the seat frame is in the second position the first longitudinal member and the second receiver are both in the extended positions. Various options and modifications are possible.

For example, if the floor includes at least one track, and the front connection may be fixed to the track. Also, the first longitudinal member may include at least one protrusion slidable within the track.

The first longitudinal member may include a securing mechanism for selectively securing the first longitudinal member to the track, and the track may include a securing structure, the securing mechanism being configured to cooperate with the securing structure in the track.

The first longitudinal member may include a wheel configured to roll along the track. The second receiver may include an attachment assembly for connection to the seat frame, and the attachment assembly may include a swivel attached to the second receiver for allowing the seat frame to rotate relative to the second receiver. A securing mechanism may be provided to selectively secure the second receiver relative to the second longitudinal member.

A first lateral member may be attached to the second receiver and a third receiver is slidable along the first lateral member between an inboard and an outboard position. The attachment assembly may include a swivel attached to third receiver for allowing seat frame to rotate relative to the third receiver. A securing mechanism may be provided to selectively secure the third receiver relative to the first lateral member.

The first position may be a TTL position and the second position may be a sleeping position. Also, the seat frame may be movable to a reclined position between the TTL and sleeping positions. The mounting assembly may be configured so that when the seat frame is in the reclined position the first longitudinal member is in the retracted position and the second receiver is in the extended position.

According to certain other aspects of the disclosure, a mounting assembly is disclosed for attaching a seat frame to a floor of a vehicle, the seat frame being movable between a first position and a second position. The mounting assembly may include a front connection immovably fixable to the floor, a first sliding assembly attached to the first connection so as to be longitudinally slidable relative thereto, and a second sliding assembly attached to both the first sliding assembly and to the seat frame so as to be longitudinally slidable independently relative to both. The mounting assembly is configured so that when the seat frame is in the second position the first and second sliding assemblies are both located in forwardly extended positions and no part of the mounting assembly contacts the floor forward of the front connection. Various options and modifications are possible.

For example, if the floor includes at least one track, and the front connection may be fixed to the track. Also, the first longitudinal member may include at least one protrusion slidable within the track.

The first longitudinal member may include a securing mechanism for selectively securing the first longitudinal member to the track, and the track may include a securing structure, the securing mechanism being configured to cooperate with the securing structure in the track.

The first position may be a TTL position and the second position may be a sleeping position.

According to other aspects of the disclosure, a mounting assembly is disclosed for attaching a seat to a floor of a vehicle, the seat being movable between a first position and a second position. The mounting assembly may include a front connection immovably fixable to the floor, means for supporting the seat in the first position and the second position without contacting the floor forward of the front connection. Various options and modifications are possible.

For example, the first position may be a TTL position and the second position may be a sleeping position.

Still further aspects of the present disclosure will be made apparent from the discussion provided below.

BRIEF DESCRIPTION OF THE DRAWINGS

The present disclosure will now be described in connection with the drawings appended hereto, in which.

DETAILED DESCRIPTION OF EMBODIMENT(S) OF THE DISCLOSURE

Figure 1:
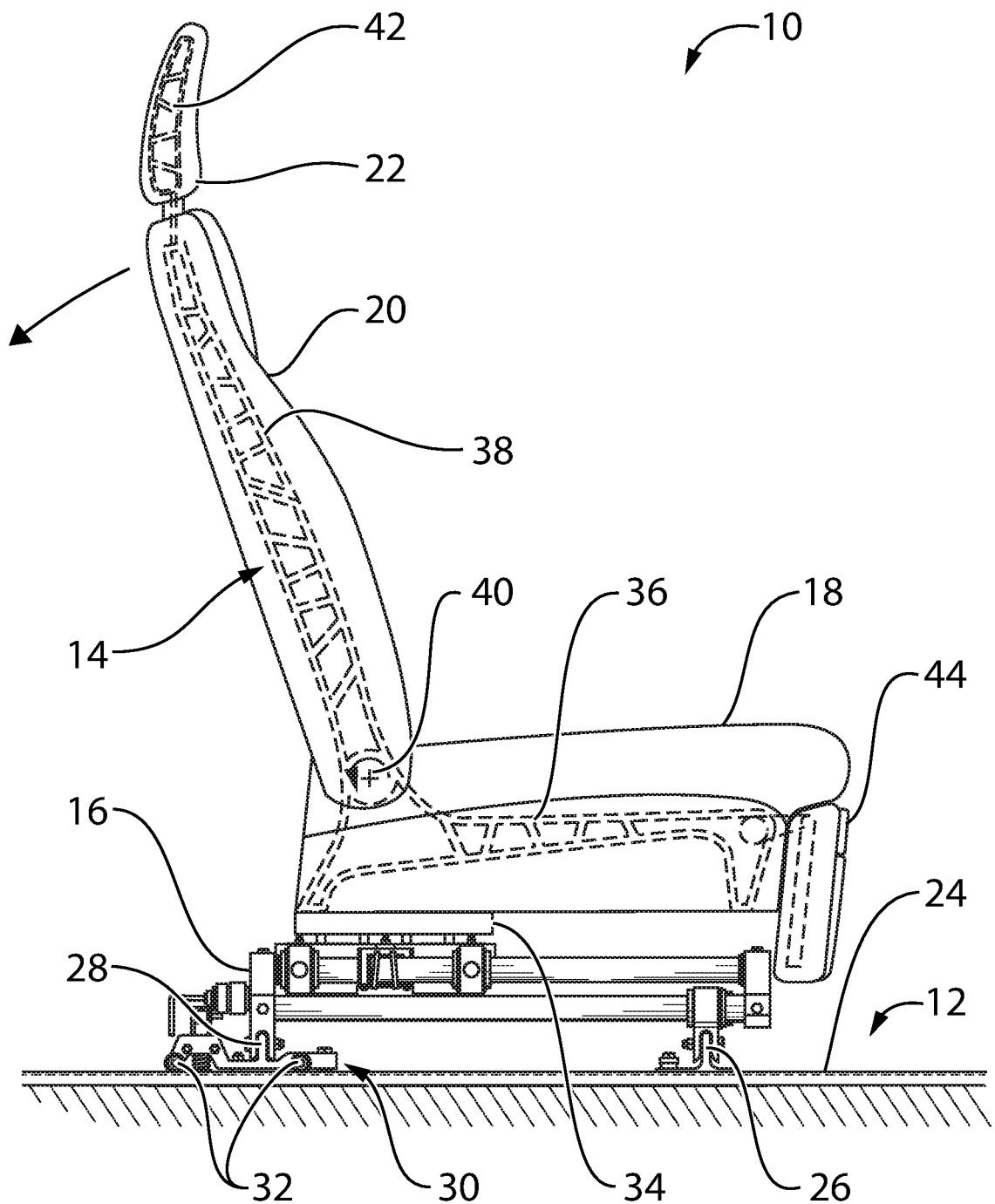
FIG. 1 is a schematic side view of a vehicle seat in a TTL position according to certain aspects of the disclosure.

The present disclosure will now be described in connection with one or more contemplated embodiments. The embodiments that are described are intended to be exemplary of the present disclosure and not limiting of the scope thereof. In other words, while attention is focused on specific embodiments of the present disclosure, those embodiments are not intended to limit the present disclosure. To the contrary, the examples provided below are intended to illustrate the broad scope of the present disclosure.

In the paragraphs that follow, the present disclosure will be described in connection with an aircraft seat 10. While the details of the aircraft seat 10 of the present disclosure are discussed in connection with the use of the seat 10 in an aircraft, it is contemplated that the seat 10 of the present disclosure may be employed in any number of suitable environments without departing from the scope of the present disclosure. For example, the seat 10 of the present disclosure may be used on a boat, bus, recreational vehicle, or train, among other contemplated vehicles and environments.

In addition, the discussion that follows will identify specific materials from which the aircraft seat 10 may be constructed. Any identification of a specific material is intended to be exemplary of the types of materials that may be employed to construct the present disclosure. As such, any discussion of specific materials is not intended to be limiting of the present disclosure.

With respect to the seat 10, there are a number of different aspects and features that are considered to be a part of the present disclosure. The specific features and aspects may be combined together or used singly on a seat without departing from the scope of the present disclosure. In other words, the seat of the present disclosure need not incorporate all of the features described herein.

With respect to aircraft, there are a number of different aircraft types that are known in the art. For example, there are commercial aircraft, with which the public is generally familiar. In addition, there are genres of business and private aircraft that are designed for private use, for charter use, or for hire operations.

The seat 10 of the present disclosure has been designed and sized for use on business, private, charter, and for-hire aircraft. While designed with business, private, charter, and for-hire aircraft in mind, the seat 10 may be sized for any type of aircraft, including commercial aircraft, without departing from the scope of the present disclosure. In addition, the seat may be employed in other environments, such as on boats, trains, automobiles, trucks, and the like.

Also, the particular structure of the seat itself may vary in terms of number and orientations of cushions, underlying structural support, pivot points, etc. Thus, the focus of this disclosure is generally on the mounting assemblies that can be employed with various types of seating designs, and with various types of vehicle flooring.

For reference, it is noted that an aircraft has a longitudinal axis that defines the forward and aft (or rear) locations on the plane. The starboard (or right side) and port (or left side) of the aircraft are defined with respect to the longitudinal axis. For purposes of the present disclosure the term "longitudinal" is employed when referring to a direction consistent with the longitudinal (front-to-back) axis of the aircraft. The term "lateral" is employed when referring to the port and starboard locations within the aircraft. The term "inboard" is employed to refer to a direction laterally toward the longitudinal axis (center) of the aircraft. The term "outboard" is employed to refer to a direction laterally away from the longitudinal axis (center) of the aircraft. The use of these terms is intended to provide context. However, the use of these terms is not intended to be limiting of the present disclosure.

FIG. 1 is a side view schematic of one embodiment of an aircraft seat according to the present disclosure. As illustrated seat 10 is in a TTL position. Seat 10 is attachable to a floor 12 of a vehicle and may include a seat frame 14 of various parts, some of which are movable relative to each other to provide different seat orientations. Seat 10 also includes a mounting assembly 16 attached to seat frame 14 for securing the seat to floor 12. Seat frame 14 may have various optional elements (not shown) such as compartments, arms, doors and trays for storage, support, etc. As indicated, seat 10 may include a seat pan 18, a backrest 20 and a headrest 22 supported by seat frame 14. Other elements could optionally be included, such as a lumbar support cushion, etc.

Floor 12 includes at least one track 24 extending along the aircraft, typically longitudinally. Tracks 24 are generally installed in pairs for a given seat or group of seats, and are generally formed from aluminum or other metal channel-like members. Mounting assembly 16 is configured to be attached to seat frame 14 and to be secured to floor 12 generally via track(s) 24. Part or all of mounting assembly 16 may be immovably fixed relative to track 24 to hold seat 10 in place. Alternatively, part of mounting assembly 16 may be movable along track 24 to change seat location or orientation (for example from a TTL position, to a reclined position, to a sleeping position, to swivel to face inwardly, to slide or swivel to approach a table or other piece of furniture, etc.).

Track 24 may interact with the mounting and adjustment elements of mounting assembly 16 such as a front connection 26, a rear connection 28, a follower 30, and/or one or more wheels 32, as schematically illustrated in FIG. 1. Exemplary embodiments of these elements are discussed in more detail below. It should be understood that if two laterally-spaced tracks 24 are employed (e.g., one on either side of the seat), it is possible to include corresponding structures on both lateral sides of mounting assembly 16. It should, however, be understood that the use of one or more tracks is not required in all aspects of this disclosure.

A swivel 34 may optionally be included as part of seat 10. As illustrated schematically for convenience, swivel 34 is located between mounting assembly 16 and seat frame 14, although swivel 34 could be considered to be part of either structure or both. Swivel 34 allows seat frame 14 to rotate (around a vertical axis) relative to mounting assembly 16 to achieve different positions, for example, facing forward, facing inward, facing rearward, or other orientations in between these positions.

Accordingly, when designing a seat for an aircraft, such as the seat 10, the seat dimensions, its attachment to the floor, and its adjustability will conform to specific dimensional requirements so that the seat may be installed in an aircraft together with other seats, furniture, and interior items. As a result, seat designs are often governed by selected specifications in terms of spacing from surrounding fixed or movable items, and in various orientations. Thus, aspects of the present seat frame 14, mounting assembly 16, cushions, orientations, etc. may be varied within the scope of the present specific disclosure to meet such selected specifications.

Figure 2:
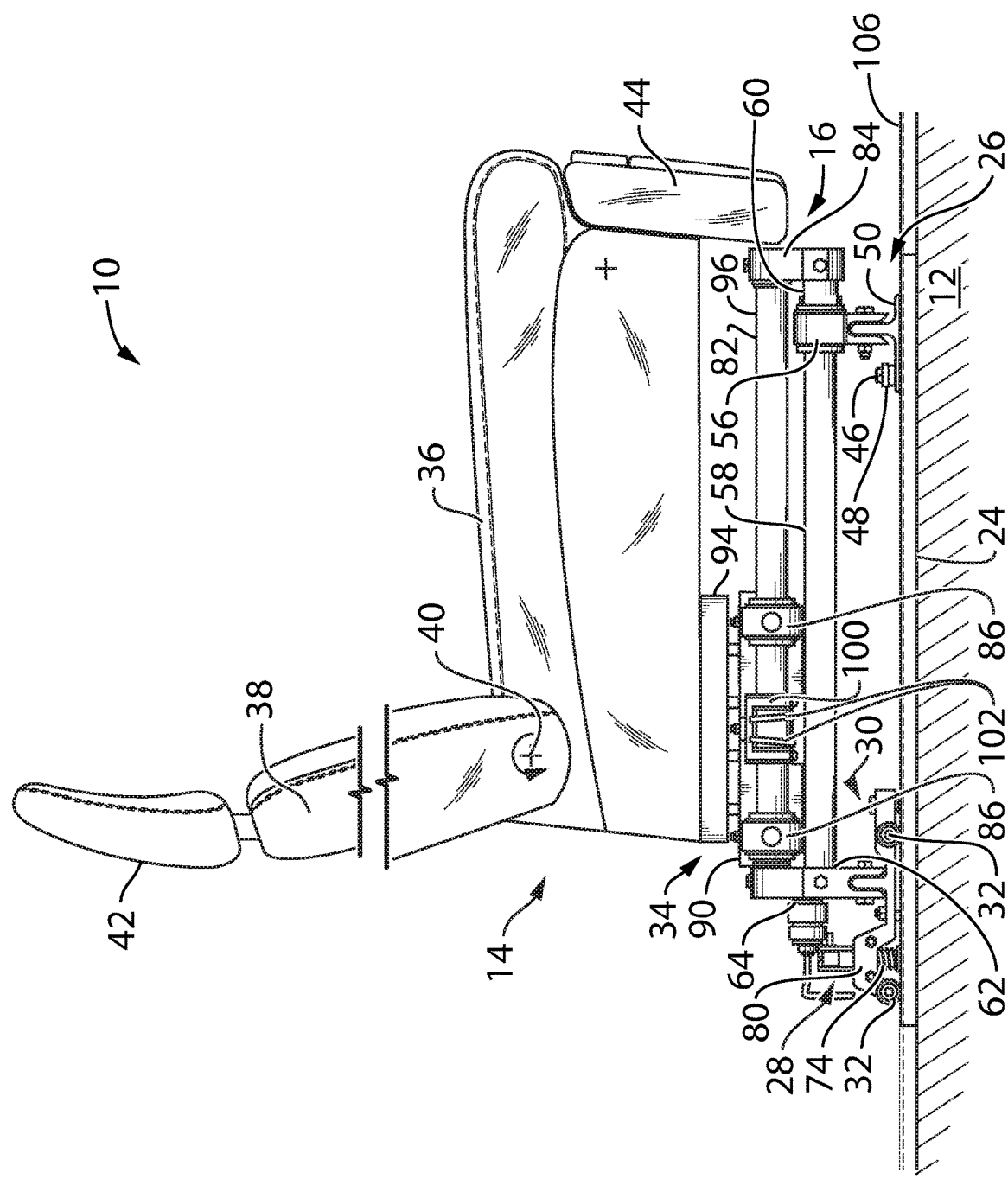
FIG. 2 is a side partially-schematic view of a vehicle seat as shown in FIG. 1 in a TTL position.
Figure 3:
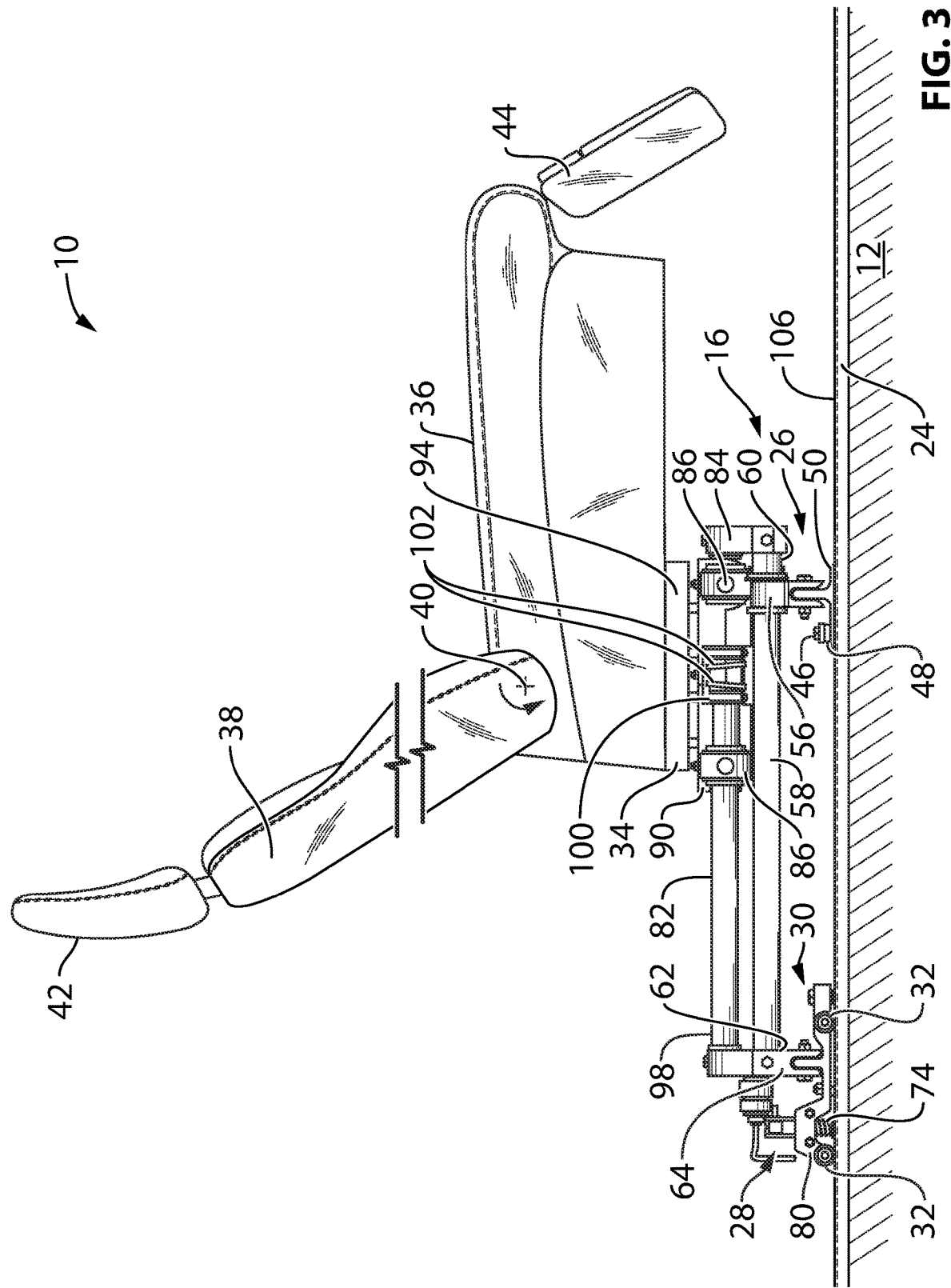
FIG. 3 is a side view as in FIG. 2, with the vehicle seat in a reclined position.
Figure 4:
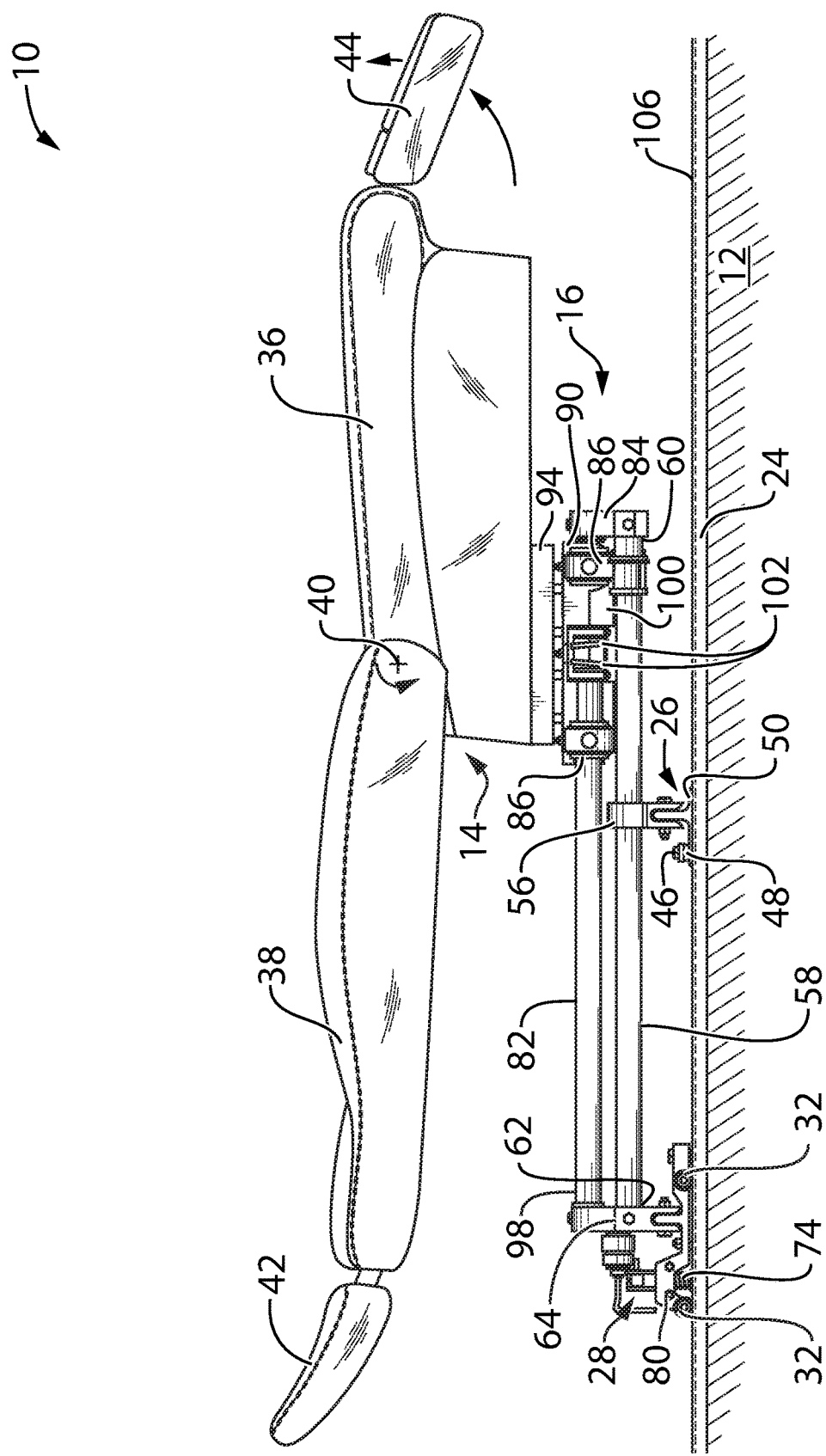
FIG. 4 is a side view as in FIG. 2, with the vehicle seat in a sleeping position.

FIGS. 2, 3, and 4 respectively show seat 10 in a TTL position, a reclined position and a sleeping position. It should be understood that seat 10 may be placed into other intermediate positions between that of FIGS. 2 and 4, if desired. For clarity herein, only one such position (FIG. 3) is shown. As illustrated in these three Figures, seat frame 14 may include a base portion 36 connected to a back portion 38 via a pivot point 40 and a head rest portion 42 connected to the back portion. A leg rest portion 44 may also be included. If so, leg rest portion 44 may also be pivotable upwards relative to base portion 36, in particular when seat 10 is in a sleeping position to create a longer "bed" surface (see arrow indicating upward pivoting in FIG. 4). If desired, a lumbar support portion (not shown) may be adjustably attached between the base portion 36 and back portion 38. Each of the seat portions may also be made of segmented movable sections with relatively articulatable parts or segments, if desired. Various mechanical, electrical, hydraulic, or pneumatic devices or combinations thereof, along with controls and sensors, may be used to effect relative movement of the elements of seat frame 14. Accordingly, the disclosed seating frame designs may be modified in various ways within the scope of the present invention.

As shown in FIGS. 3-8, front connection 26 of mounting assembly 16 is immovably fixable to floor 12. "Immovably fixable" means fixed in place during installation and not intended to be moved by a user, for example as a positional adjustment. "Immovably fixable" does not mean that the first connection cannot be detached, for example, by a technician, for purposes of service, cleaning, redesign of the cabin, etc. Thus, front connection 26 may include a threaded member or other connector 46 for securing a front mounting portion such as a bushing 48 of mounting assembly 16 to floor 12. Front connection 26 may also include a follower 50 shaped to fit within track 24 and to threadably receive threaded member 46 to hold bushing 48 to the follower. Track 24 may include one or more openings 52 configured to receive bushing 48 and follower 50. If bushing 48 is round, opening 52 may be correspondingly round, scalloped, etc. Multiple openings 52 may be provided to allow follower 50 to be dropped from above into channel 54 within track 24, and then slid longitudinally to a location where channel will interfere with follower and prevent it from lifting out of the channel.

Accordingly, to secure front connection 26 to floor 12, using the structures shown herein one may move mounting assembly 16 into and along track 24 until a desired location were reached. Follower 50 would be within the channel 54 within track 24. Threaded member 46 would be tightened, thereby securing bushing 48 within opening 52. Front connection 26 is thus held longitudinally against sliding along track 24 and vertically against lifting out of track 24. Typically, each side of mounting assembly 16 has such structure for interacting with and connecting to respective tracks. Each such front connection 26 is, thus, immovably fixed to track 24, and is only releasable for example by a technician with tools. However, front connection 26 is infinitely, or at least discretely, positionable at many positions along track 24, limited only by the locations of openings 52. Further, openings 52 are not required in all embodiments as other securing structures could be employed. Moreover, track 24 is not required in all embodiments, as alternate structures could be employed to attach mounting assembly 16 to floor 12.

Front connection 26 also has a first receiver 56 for slidably receiving a first longitudinal member 58, which as illustrated may be a tubular member. Accordingly, first receiver 56 may be a round collar or the like for slidably receiving tubular member 58 while maintaining its longitudinal orientation. If longitudinal member 58 is something other than tubular, first receiver 56 may be configured accordingly to slidably receive the longitudinal member.

A first end 60 of first longitudinal member 58 is located forward of front connection 26 and a second end 62 is located behind the front connection secured to a rear mounting structure 64. A number of elements are secured to rear mounting structure 64. For example, follower 30 which may comprise a protrusion 66 with a t-shaped cross section adapted to slide within channel 54 or track 24 may extend from rear mounting structure 64. Further aligning protrusions 68 may also be provided to fit within and slide along channel 54. If desired, aligning protrusions 68 may include a shape so that they may be dropped vertically into corresponding openings or scallops 70 in track 24.

Rear connection 28 may also have a securing mechanism for selectively securing first longitudinal member 58 to track 24. As illustrated, securing mechanism is a vertically movable element such as a pin or plunger 74 that cooperates with a securing structure 76 in track 24. Vertically movable element 74 may be biased (spring-loaded, servo driven, etc.) downward toward track 24 to seat within structure 76 (in this case a round scallop shape). Movement of element 74 upward may be by electric, servo motor, hydraulic, pneumatic or other means, depending on the seat design and application. A second structure 78 (see FIG. 7) at a forward location along track 24 may receive element 74 when rear connection 28 is moved to that position, for example when the position of the seat is adjusted will be described below.

Element 74 is mounted on a member 80 extending longitudinally along track 24. Wheels 32, protrusion 66 and aligning protrusions 68 may all be connected to member 80 so as to move together along track 24. Protrusion 68 may be held in place by a fastener such as a threaded member 69 or other structure.

A second longitudinal member 82 is attached to and movable with first longitudinal member 58. Second longitudinal member 82 is attached at its ends to front mounting structure 84 and rear mounting structure 64. Second longitudinal member 82 may be tubular or some other shape, as discussed above with regard to first longitudinal member 58. As first longitudinal member 58 is slid forward and back relative to first receiver 56, mounting structures 64, 84 and second longitudinal member 82 move together as a unit (compare the positions of FIGS. 7 and 8).

At least one second receiver 86 is slidable along each second longitudinal member 82 between a retracted position (FIG. 2) and an extended position (FIG. 4). As illustrated, four second receivers 86 are provided in aligned pairs, with a lateral member 88 extending between each pair. A plate 90 is slidably mounted on at least one third receiver 92 per lateral member 88 so as to allow the plate to slide laterally between second longitudinal members 82. An optional swivel plate 94 (schematically shown) may be rotationally mounted to plate 90. Seat frame 14 may be mounted either to plate 90 (if no rotation is desired) or to swivel plate 94 (if rotation is desired).

Plate 90, plate 94, members 88 and receivers 86 may slide forward and back as a unit between front and rear ends 96, 98 of second longitudinal members 82. A locking mechanism 100 may be provided for securing such elements relative to second longitudinal members 82 (and accordingly first longitudinal member 58). Locking mechanism 100 may be any sort of actuated securing mechanism, such as a mechanical or electromechanical latch, spring loaded washer type clutch (see washers 102 in mechanism 100 in FIGS. 2-4), etc. Similar locking mechanisms 104 may be attached to plate 90 for securing it along laterally extending members 88.

Cross members 104, 106 and 108 may be provided to provide strength and stability to mounting assembly 16. Cross member 104 are fixed in place between front connections 26 and do not move relative thereto. Cross members 106 and 108 are mounted between second mounting structures 84 and first mounting structures 64, respectively. Thus, cross members 106 and 108 move longitudinally as a unit with first and second longitudinal members 58 and 82.

Figure 5:
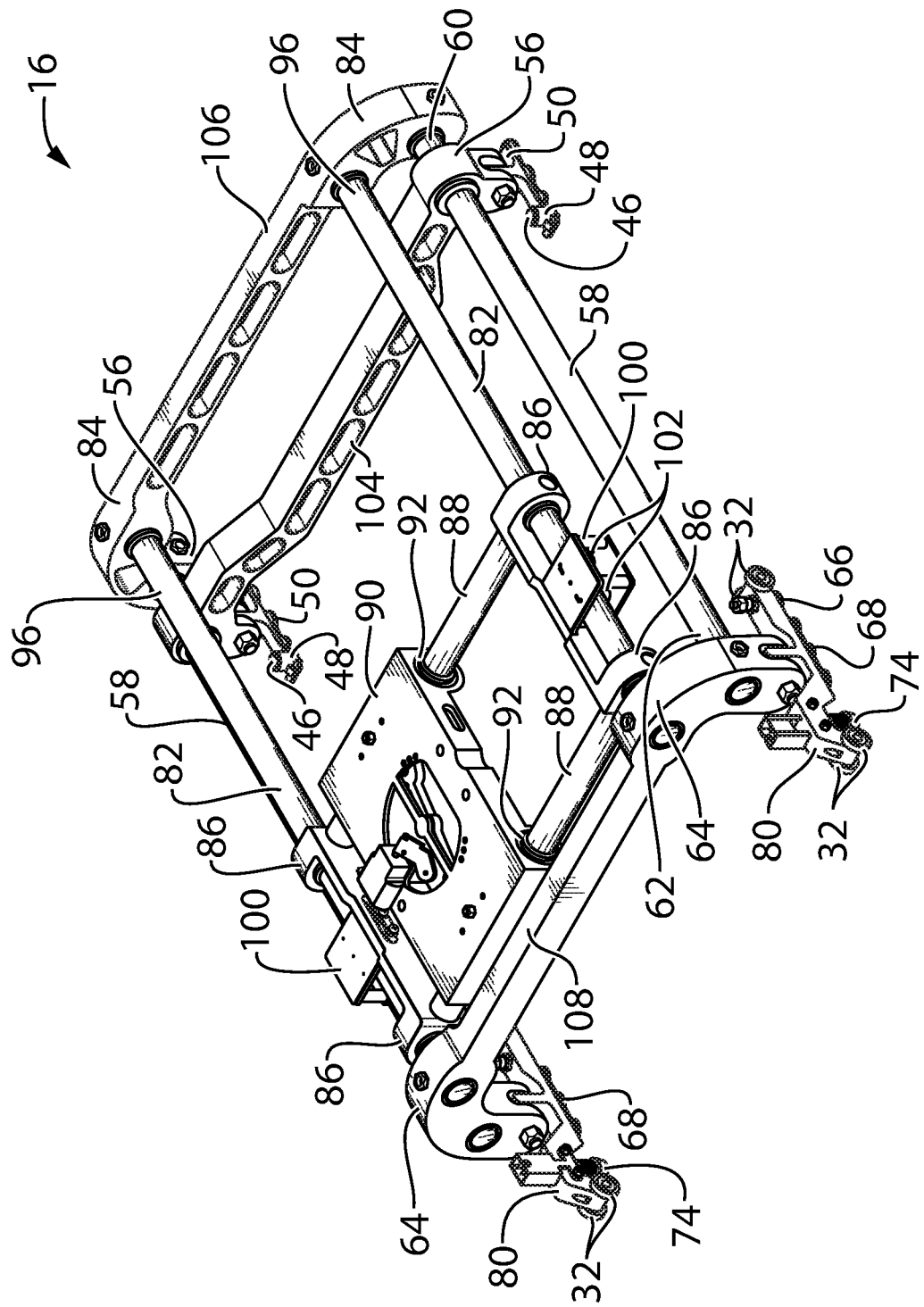
FIG. 5 is a top perspective view of a mounting assembly of the vehicle seat of FIG. 1, in a TTL position.
Figure 6:
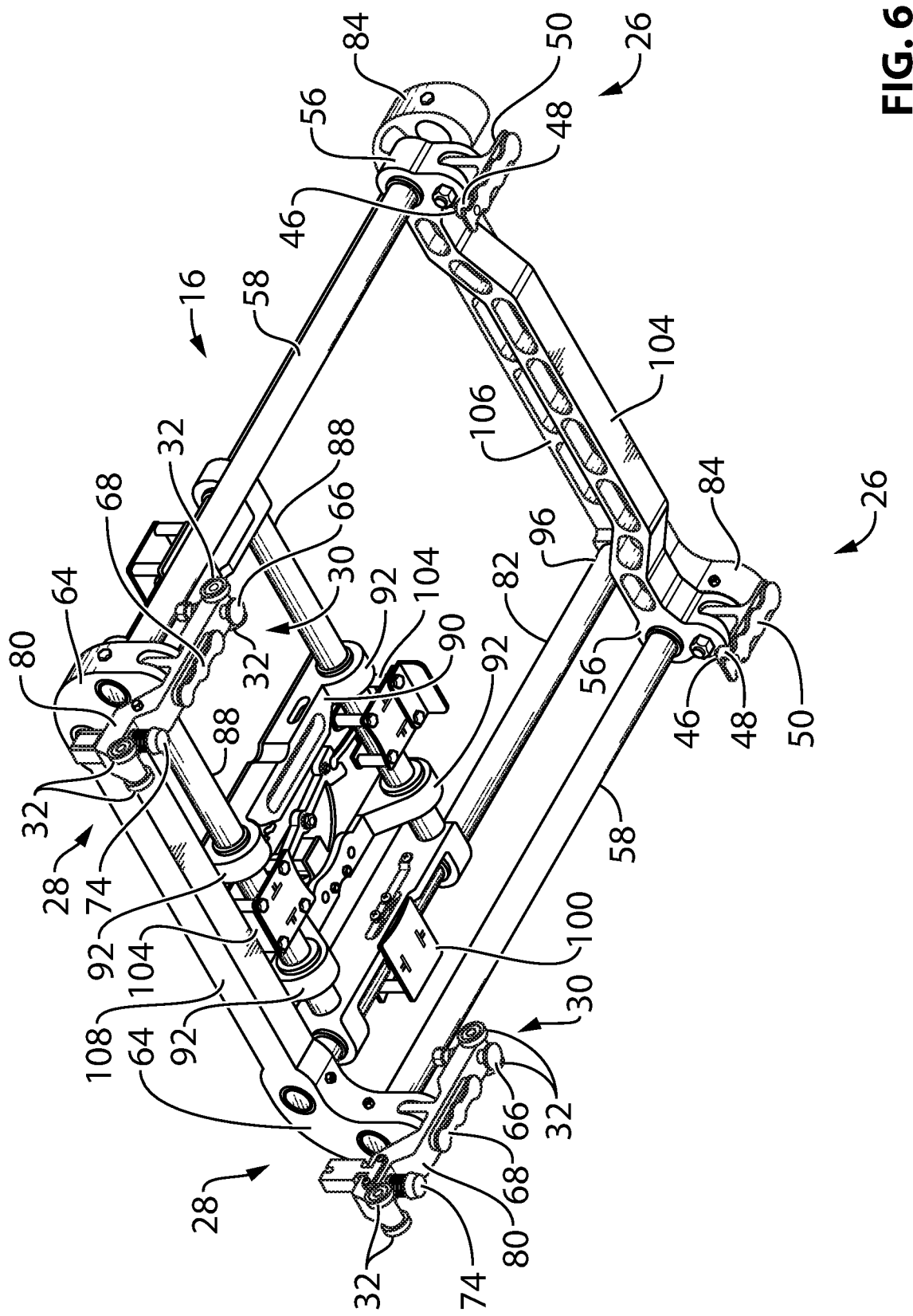
FIG. 6 is a bottom perspective view of the mounting assembly as in FIG. 5.
Figure 7:
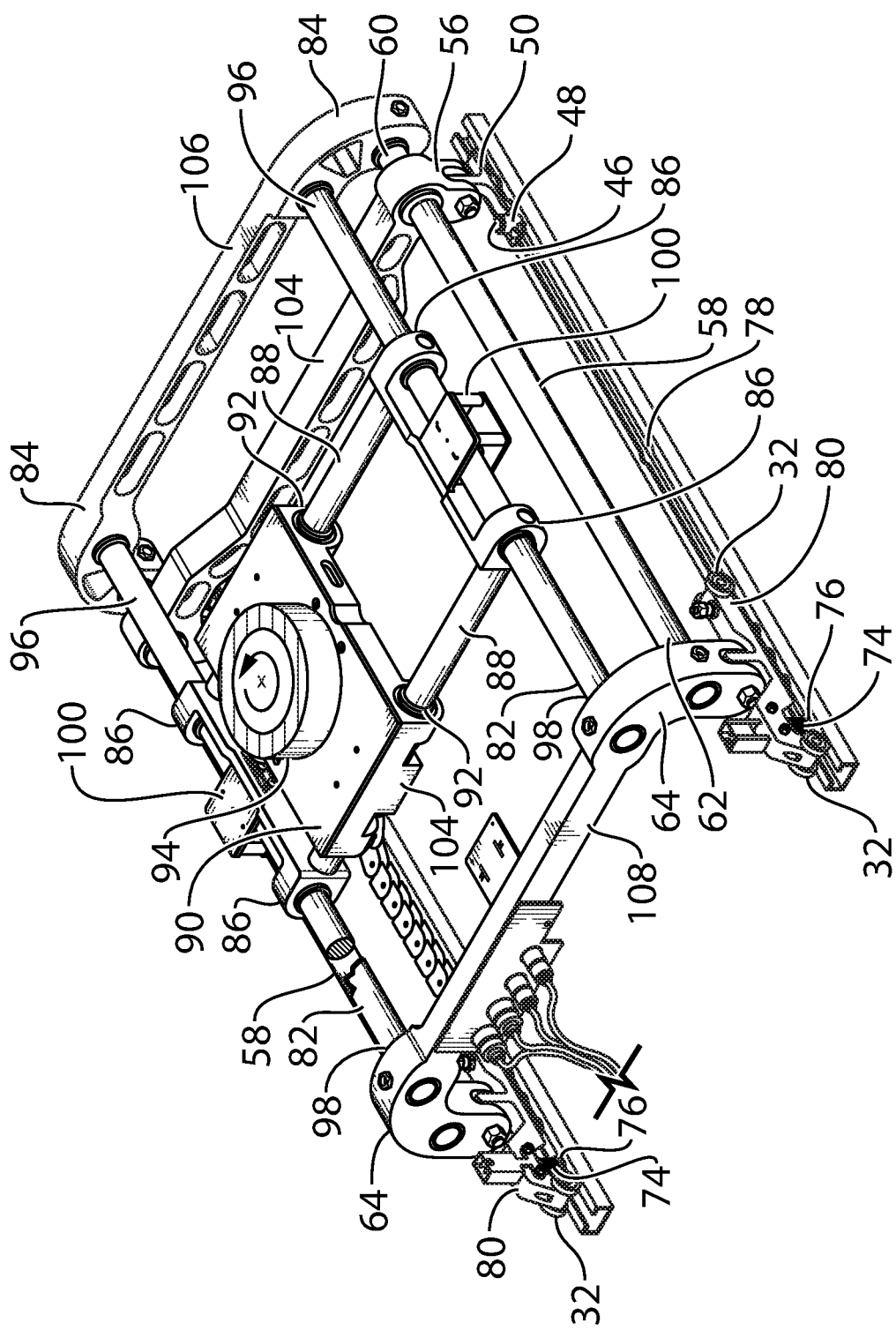
FIG. 7 is a top perspective view of the mounting assembly as in FIG. 5, with the structures moved toward a reclined position and/or in a partial reclined position.
Figure 8:
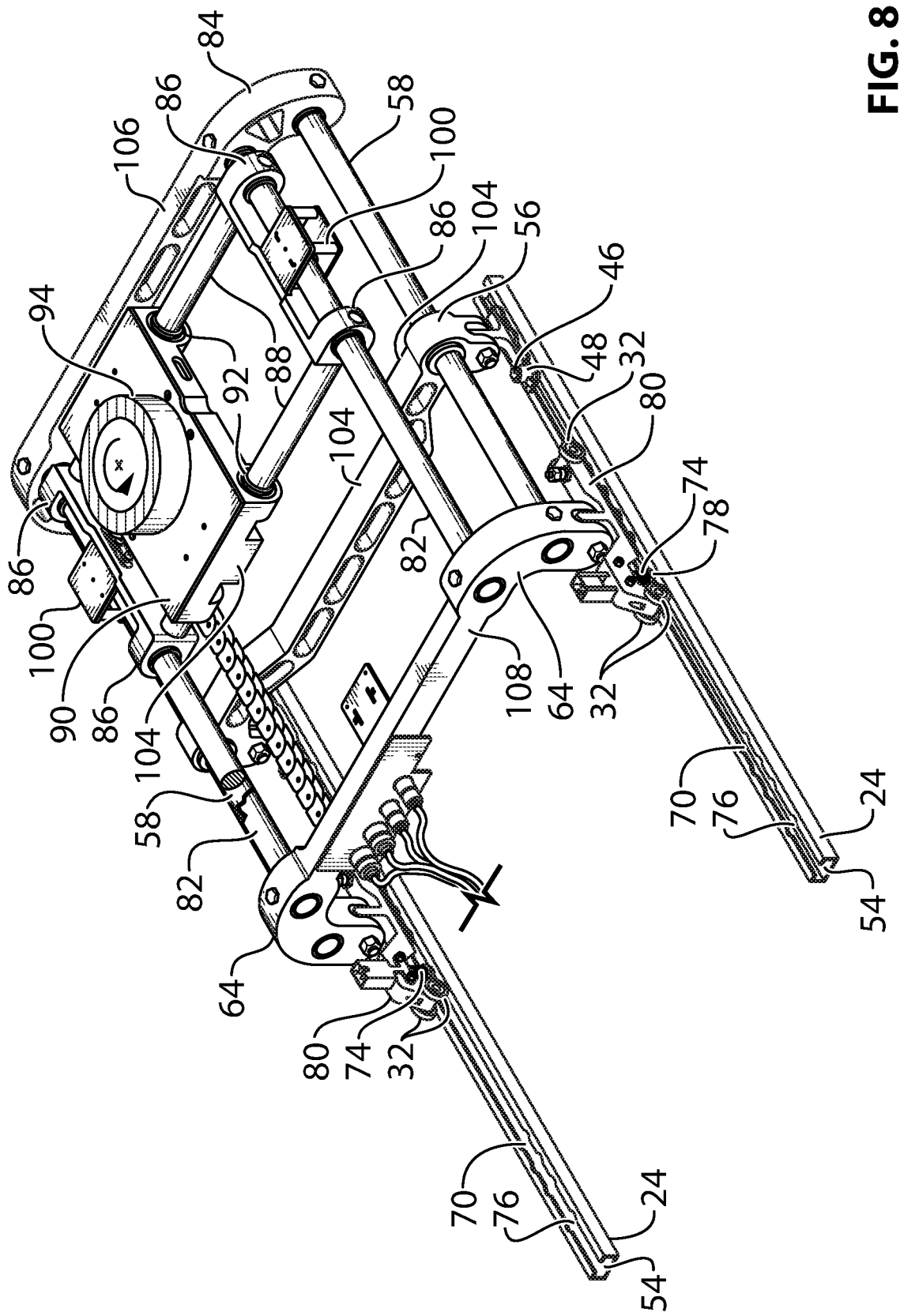
FIG. 8 is a top perspective view of the mounting assembly as in FIG. 5, with the structures in a sleeping position.
Figure 9:
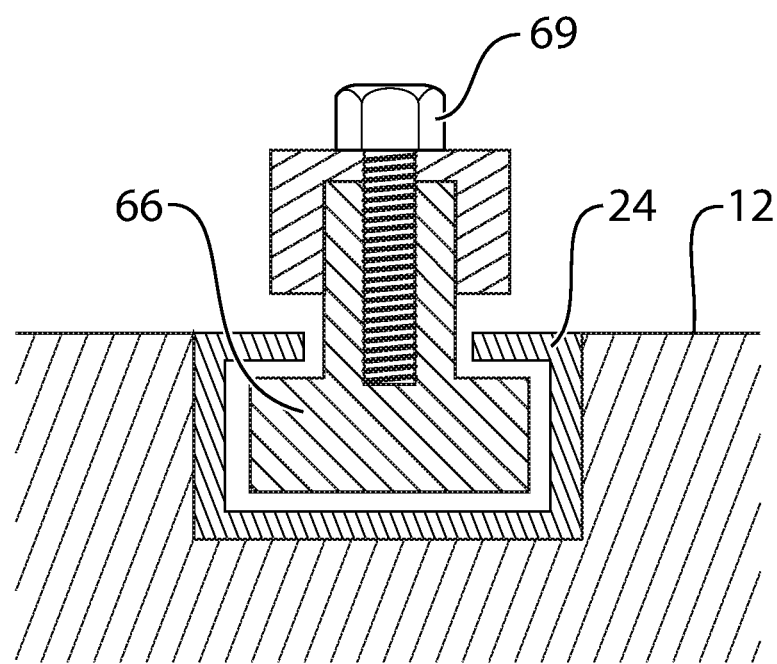
FIG. 9 is a cross-sectional view of a portion of a track in a floor of the vehicle and a follower of the mounting assembly.

The structures above provide ready adjustment of seat 10. For example, FIG. 2, shows seat 10 in the TTL position. As shown, rear connection 28 is in a rearward position, and accordingly both first and second longitudinal members 58 and 82 are in retracted positions. FIGS. 5 and 6 also show mounting assembly 16 in such position.

Seat 10 can be moved to an intermediate, reclined position such as is shown in FIG. 3. As illustrated therein, front connection 26 and longitudinal members 58 and 82 have not moved. Instead, second receivers 86 have slid forward along second longitudinal members 82. To do so, locking mechanism 100 would disengage before movement then reengage to hold receivers 86, plate 90 and ultimately seat frame 14 in the forward location. Such elements can be moved forward and back along longitudinal members 82 manually or by a conventional motor, pneumatics, hydraulics, etc., as controlled by input devices and a controller or the like.

Seat 10 can also be moved to a sleeping position as shown in FIG. 4. As illustrated therein, as compared to the position of FIG. 3, front connection 26 has still not moved. However, rear connection 28 has been moved forward. Accordingly, longitudinal members 58 and 82 have slid forward, as guided by first receiver 56. Movable plunger element 74 has been disengaged from rear opening 76 in track 24 and has been engaged in forward opening 78 in the track. Therefore, when seat frame 14 is in the sleeping position, the first longitudinal member 58 and the second receiver 86 are both in their respective extended (forward) positions.

Notably, no part of mounting assembly 16 contacts floor 12 forward of front connection 26 in any position, but in the reclined or sleeping positions in particular. No slider or the like at the front of seat 10 has to move forward in the tracks to accommodate movement of the seat from the TTL position toward and to the sleeping position. Therefore, if track 24 extends a distance in front of seat 10, for example to receive other seats or furniture or the like, a track cover 106 and/or carpeting may be placed over track 24 directly in front of front connection 26. Such structure provides a more visually pleasing and less physically cluttered structure in front of seat 10, in particular when the seat is in the TTL position. Thus, the disclosed structure in particular the mounting assembly provides a means for supporting seat 10 in the TTL position and the sleeping position without contacting floor 12 forward of the front connection 26.

It should be understood that the benefits noted above are not limited only to use with the TTL, sleeping and/or reclined positions. Thus, the mounting assembly and seat can generally be said to be movable between a first position and a second position without having structure contact or slide along or within the floor forward of the front connection. Such benefits may be most notable to a user in a fully upright TTL position, but are applicable to any position.

With respect to the various embodiments described for the present disclosure, features described for one embodiment may be applied to other embodiments without departing from the scope of the present disclosure. Accordingly, the discussion of specific features with respect to one embodiment should not be understood to be limited solely to that embodiment.

As noted above, the present disclosure encompasses a broad scope. Any discussion of specific details in connection with embodiments is not intended to be limiting of the disclosure. To the contrary, the specific embodiments described above are intended to illustrate the breadth of the present disclosure.

What is claimed is:

1. A seat assembly attachable to a floor of a vehicle, the seat assembly comprising:
   a seat frame movable between a first position and a second position; and
   a mounting assembly attached to the seat frame and configured to be secured to the floor, the mounting assembly including:
   a front connection immovably fixable to the floor and having a first receiver;
   a first longitudinal member slidable in the first receiver between a retracted position and an extended position;
   a second longitudinal member fixed in relation to and movable with the first longitudinal member via a front mounting structure, the front mounting structure being forward of the front connection;
   a second receiver slidable along the second longitudinal member between a retracted position and an extended position, the seat frame being attached to the second receiver;
   a track attachable to the floor, the front connection being immovably fixed to the track; and
   a rear connection slidable in the track in relation to the front connection, and fixed in relation to and movable with the first longitudinal member;
   wherein, when the seat frame is in the first position the first longitudinal member and the second receiver are both in the retracted positions, and
   wherein, when the seat frame is in the second position the first longitudinal member and the second receiver are both in the extended positions.

2. The seat assembly of claim 1, wherein the rear connection includes at least one protrusion slidable within the track.

3. The seat assembly of claim 1, wherein the rear connection includes a securement for selectively securing the rear connection to the track.

4. The seat assembly of claim 3, wherein the track includes a securing structure, the securement configured to cooperate with the securing structure in the track.

5. The seat assembly of claim 1, wherein the rear connection includes a wheel configured to roll along the track.

6. The seat assembly of claim 1, wherein the second receiver includes an attachment assembly for connection to the seat frame.

7. The seat assembly of claim 6, wherein the attachment assembly includes a swivel attached to the second receiver for allowing the seat frame to rotate relative to the second receiver.

8. The seat assembly of claim 6, wherein a first lateral member is attached to the second receiver and a third receiver is slidable along the first lateral member between an inboard and an outboard position.

9. The seat assembly of claim 8, wherein the attachment assembly includes a swivel attached to the third receiver for allowing the seat frame to rotate relative to the third receiver.

10. The seat assembly of claim 9, further including a securement to selectively secure the third receiver relative to the first lateral member.

11. The seat assembly of claim 1, further including a securement to selectively secure the second receiver relative to the second longitudinal member.

12. The seat assembly of claim 1, wherein the first position is a TTL position and the second position is a sleeping position.

13. The seat assembly of claim 12, wherein the seat frame is movable to a reclined position between the TTL and sleeping positions, and wherein when the seat frame is in the reclined position the first longitudinal member is in the retracted position and the second receiver is in the extended position.

* * * * *